US009258157B2

(12) United States Patent
Bai et al.

(10) Patent No.: US 9,258,157 B2
(45) Date of Patent: Feb. 9, 2016

(54) METHOD AND SYSTEM FOR MAPPING BIT SEQUENCES

(71) Applicant: Orange, Paris (FR)

(72) Inventors: Baoming Bai, Xi'an (CN); Lin Zhou, Xi'an (CN); Yajuan Luo, Beijing (CN)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/368,739

(22) PCT Filed: Dec. 14, 2012

(86) PCT No.: PCT/IB2012/002923
§ 371 (c)(1),
(2) Date: Jun. 25, 2014

(87) PCT Pub. No.: WO2013/098640
PCT Pub. Date: Jul. 4, 2013

(65) Prior Publication Data
US 2014/0376665 A1    Dec. 25, 2014

(30) Foreign Application Priority Data

Dec. 27, 2011    (WO) ................ PCT/CN2011/084725

(51) Int. Cl.
*H04L 5/12*        (2006.01)
*H04L 23/02*       (2006.01)
(Continued)

(52) U.S. Cl.
CPC ............... *H04L 27/02* (2013.01); *H04L 1/005* (2013.01); *H04L 1/0027* (2013.01);
(Continued)

(58) Field of Classification Search
CPC ..... H04L 27/38; H04L 27/34; H04L 27/3488; H04L 1/0041; H04L 1/0071; H04L 27/02; H04L 27/3411; H04L 27/3433; H04L 1/005; H04L 1/0057; H04L 25/067; H04L 25/03318
See application file for complete search history.

(56) References Cited

U.S. PATENT DOCUMENTS

2005/0074068 A1*  4/2005  Borran et al. ................. 375/264
2005/0216821 A1   9/2005  Harada
(Continued)

FOREIGN PATENT DOCUMENTS

WO        2007046558 A1    4/2007

OTHER PUBLICATIONS

International Search Report and Written Opinion dated Jun. 27, 2013 for corresponding International Application No. PCT/IB2012/002923, filed Dec. 14, 2012.
(Continued)

*Primary Examiner* — Ted Wang
(74) *Attorney, Agent, or Firm* — David D. Brush; Westman Champlin & Koehler, P.A.

(57) ABSTRACT

A method of mapping a plurality of different bit sequences to a plurality of different signal points in a constellation, the number of bit sequences being greater than the number of signal points. The method includes, for a device in a telecommunication network, the acts of: determining, for each signal point in the constellation, a number of bit sequences to be mapped to each signal point, the numbers of bit sequences being distributed according to a discrete Gaussian distribution among the constellation, selecting in the plurality of bit sequences, for each signal point in the constellation, a set including the determined number of bit sequences (u) that minimize the maximal Hamming distance among the selected sets.

15 Claims, 6 Drawing Sheets

(51) Int. Cl.
*H04L 27/02* (2006.01)
*H04L 27/34* (2006.01)
*H04L 1/00* (2006.01)
*H04L 25/03* (2006.01)
*H04L 25/06* (2006.01)

(52) U.S. Cl.
CPC ............. *H04L 1/0071* (2013.01); *H04L 27/34* (2013.01); *H04L 27/3411* (2013.01); *H04L 25/03318* (2013.01); *H04L 25/067* (2013.01); *H04L 27/3433* (2013.01)

(56) References Cited

U.S. PATENT DOCUMENTS

| | | | |
|---|---|---|---|
| 2006/0056551 A1* | 3/2006 | Lozhkin | H04L 25/067 375/348 |
| 2007/0216786 A1* | 9/2007 | Hung et al. | 348/246 |
| 2009/0052594 A1* | 2/2009 | Li et al. | H03M 13/373 375/341 |
| 2009/0135926 A1* | 5/2009 | Tsouri et al. | 375/260 |
| 2009/0168917 A1 | 7/2009 | Noda et al. | |

OTHER PUBLICATIONS

Ngo N. H. et al., "Performance of Non-Uniform 16Qam Modulation Over Linear and Nonlinear Channels", Electronics Letters, IEE Stevenage, GB, vol. 42, No. 9, Apr. 27, 2006, pp. 544-546, XP006026558.

Moore B. et al., "Pairwise Optimization of Modulation Constellations for Non-Uniform Sources", Canadian Journal of Electrical and Computer Engineering/Revue Canadienne De Genie Electrique and Informatique, vol. 34, No. 4, Oct. 1, 2009, pp. 167-177, XP011319623.

Bennatan A. et al., "On the Application of LDPC Codes to Arbitrary Discrete-Memoryless Channels", IEEE Transactions on Information Theory, vol. 50, No. 3, Mar. 1, 2004, pp. 417-438, XP011109005.

International Search Report dated Sep. 12, 2012 for corresponding Chinese International Application No. PCT/CN2011/084725, filed Dec. 27, 2011.

* cited by examiner

US 9,258,157 B2

METHOD AND SYSTEM FOR MAPPING BIT SEQUENCES

CROSS REFERENCE TO RELATED APPLICATIONS

This Application is a Section 371 National Stage Application of International Application No. PCT/IB2012/002923, filed Dec. 14, 2012, which is incorporated by reference in its entirety and published as WO 2013/098640 on Jul. 4, 2013, in English.

FIELD OF THE INVENTION

The present invention relates in general to telecommunication networks and more specifically to the processing of digital signals used in such telecommunication networks.

BACKGROUND OF THE INVENTION

In telecommunication networks, modulation is the process of conveying a message signal, for example a digital bit stream or an analog audio signal, inside another signal that may be physically transmitted over a communication channel.

Different types of modulation schemes may be used by a device in a telecommunication network in order to send a digital bit stream over a communication channel. Some known modulation schemes, for example 8-Pulse Amplitude Modulation (8-PAM) or 16-Quadrature Amplitude Modulation (16-QAM), imply first coding the digital bit stream using an alphabet comprising a plurality of different binary sequences, called bit sequences. Hence, when bit sequences are coded on n bits, the alphabet comprises a total number of $2^n$ different bit sequences that may be used for coding the digital bit stream. Each bit sequence of the coded message signal is further mapped, i.e. associated or assigned, to a discrete value, called signal point, which corresponds to a symbol that is embedded in the signal transmitted over the communication channel. Consequently, a mapping between a bit sequence coded on n bits and a signal point allows sending n bits of information by only sending the corresponding one symbol. In such a mapping, $2^n$ different bit sequences are mapped to a plurality of M different signal points, called M-ary constellation. For example, in 8-PAM, $2^n$ bit sequences are mapped to 8 signal points and, in 16-QAM, $2^n$ bit sequences are mapped to 16 signal points.

When the number of bit sequences ($2^n$) is equal to the number of signal points (M), each bit sequence is mapped to one, and only one, signal point. In this case, the mapping is called uniform mapping. When the number of bit sequences ($2^n$) is greater than the number of signal points (M), one or several bit sequences are mapped to one, and only one, signal point. In other words, one set of at least one bit sequence is mapped to one signal point, bit sequences in a set being different from each others and from the bit sequences in the other sets. In this case, the mapping is called non-uniform or quantization mapping. Such a quantization mapping allows mapping more different bit sequences than a uniform mapping with the same number of signal points, increasing thus the performance of the modulation scheme and therefore optimizing the use of the capacity of the communication channel.

In the document "On the application of LDPC codes to arbitrary discrete-memoryless channels", 2004, A. Bennatan and D. Burshtein used a quantization mapping in a known modulation system, called Bit-Interleaved Coded Modulation-Iterative Decoding (BICM-ID) system. Such a mapping was specifically designed to improve the shaping gain, i.e. reduce the average transmit power, of a transmission on the communication channel. As described in reference to FIG. 1, it implies, firstly, determining, for each signal point x, a number Nb of bit sequences u to be mapped to said each signal point x, the numbers Nb of bit sequences u being distributed according to a discrete Gaussian distribution among the constellation of signal points x, and, secondly, mapping to each signal point x in the constellation, the determined number Nb of bit sequence(s) u, in the natural increasing or respectively decreasing order, all the mapped bit sequences u being different. Such a mapping is called a natural mapping. In the mapping illustrated by FIG. 1 using a 10-PAM modulation scheme, sixteen bit sequences u, coded on four bits are mapped to M=10 signal points x={−9, −7, −5, −3, −1, 1, 3, 5, 7, 9}: 0000 (Nb=1) is mapped to x=−9, 0001 (Nb=1) is mapped to x=−7, 0010 (Nb=1) is mapped to x=−5, 0011 and 0100 (Nb=2) are mapped to x=−3, 0101, 0110, 0111 (Nb=3) are mapped to x=−1, 1000, 1001, 1010 (Nb=3) are mapped to x=1, 1011 and 1100 (Nb=2) are mapped to x=3, 1101 (Nb=1) is mapped to x=5, 1110 (Nb=1) is mapped to x=7 and 1111 (Nb=1) is mapped to x=9.

However, in this solution, the shaping gain is not optimal as bit sequences are mapped to signal points in a natural order.

Today there is no solution to efficiently map a plurality of bit sequences to a plurality of signal points that optimize the shaping gain of a transmission over a communication channel and thus allows improving efficiency of such telecommunication systems.

Today there is a need for an optimized solution that can be easily implemented on the existing communication infrastructures.

SUMMARY OF INVENTION

It is an object of the present system to overcome disadvantages and/or make improvement over the prior art.

To that extend, the invention concerns a method of mapping a plurality of different bit sequences to a plurality of different signal points in a constellation, the number of bit sequences being greater than the number of signal points, said method comprising, for a device in a telecommunication network, the acts of:

determining, for each signal point in the constellation, a number of bit sequences to be mapped to said each signal point, the numbers of bit sequences being distributed according to a discrete Gaussian distribution among the constellation, selecting in the plurality of bit sequences, for each signal point in the constellation, a set comprising the determined number of bit sequences that minimize the maximal Hamming distance among the selected sets.

A selected set, comprising therefore the corresponding determined number of different bit sequence(s), is thus mapped to each signal point, each bit sequence of the alphabet of bit sequences being used in the mapping only once and being mapped with one and only one signal point in the constellation.

The Hamming distance between two bit sequences corresponds to the number of different bits between said two bit sequences. For example, 0000 and 0001 have a Hamming distance equals to one as only the last bit is different, 0000 and 1111 have a Hamming distance equals to four as the four bits are different. The maximal Hamming distance within or of a set of bit sequences corresponds to the greatest Hamming distance between any two bit sequences of the set. By minimizing the maximal Hamming distance among the selected sets, it is meant obtaining a mapping wherein the maximal Hamming distance in each set of bit sequences is minimized among all the combination of possible set selections.

The method according to the invention allows to improve and optimize the shaping gain and to approach sensibly near the maximum channel capacity of the telecommunication system.

In an embodiment according to the invention, the method further comprises a preliminary act, subsequently to the act of determining, of selecting a first set of bit sequences for a first signal point, the Hamming distance of which being smaller or equals to two.

The preliminary act may further comprise selecting a first bit sequence then selecting as many bit sequences as needed to reach the determined number of bit sequences in the first set, each further selected bit sequence being different from the first bit sequence by only one bit. This allows minimizing the maximal Hamming distance in the selected set of bit sequences.

In an embodiment according to the invention, the act of selecting a set further comprises, for a second signal point being a neighboring signal point of the first signal point in the constellation, selecting a second bit sequence in a second set, which minimize the average Hamming distance between said second bit sequence and the first set selected for the first signal point, then selecting as many bit sequences as needed to reach the determined number of bit sequences in the second set.

By neighboring signal points, it is meant a signal point immediately before or immediately after the signal point in a constellation being a series of consecutive signal points or a signal point immediately on the left, on the right, above or below the signal point in a constellation being a two-dimensional matrix of signal points. The average Hamming distance between a bit sequence in a set selected for a second signal point and a set selected for a first signal point is the average of the Hamming distances between said bit sequence in the second set and each of the bit sequences in the first set.

In an embodiment according to the invention, the act of selecting a set further comprises, for a third signal point being a neighboring signal point of the first signal point or of the second signal point in the constellation, selecting a third bit sequence in a third set, which minimize the average Hamming distance with the first set selected for the first signal point, or, respectively, with the second set selected for the second signal point, then selecting as many bit sequences as needed to reach the determined number of bit sequences in the third set.

In an embodiment according to the invention, the act of selecting is performed for all the signal points in the constellation until all the bit sequences have been selected.

In an embodiment according to the invention, the act of selecting is performed starting from each one of the signal points in the constellation as being a first signal point to derive a plurality of selections of selected sets.

In an embodiment according to the invention, the act of selecting further comprises selecting a selection with the minimum maximal Hamming distance in each selected sets.

In an embodiment according to the invention, the act of selecting further comprises selecting a selection with the minimum average of the average Hamming distances among the selected sets.

In an embodiment according to the invention, the act of selecting further comprises selecting the bit sequences that minimize the average Hamming distance of each set.

By discrete Gaussian, it is meant here approaching near a Gaussian distribution of discrete values.

In an embodiment according to the invention, the act of determining further comprises associating signal points closest from the center of the constellation with the greatest numbers of bit sequences to be mapped to said signals points and associating signal points furthest from the center of the constellation with the smallest numbers of bit sequences to be mapped to said signals points. For example, each signal points closest from the center of the constellation may be associated with 3 bit sequences.

In an embodiment according to the invention, the act of determining further comprises selecting a distribution of numbers of bit sequences which approach the most near a Gaussian distribution of discrete values for the same constellation.

In an embodiment according to the invention, the act of determining further comprises performing the determination of all the possible discrete Gaussian distributions of numbers of bit sequence, calculating, for each determined distribution, a mutual information between an input signal and a output signal over an Additive White Gaussian Noise channel and selecting, among the determined distributions, the distribution with the maximum calculated mutual information.

The invention also concerns a device in a telecommunication network for mapping a plurality of different bit sequences to a plurality of different signal points in a constellation, the number of bit sequences being greater than the number of signal points, said device comprising:

a determination unit configured for determining, for each signal point in the constellation, a number of bit sequences to be mapped to said each signal point, the numbers of bit sequences being distributed according to a discrete Gaussian distribution among the constellation, a selection unit configured for selecting in the plurality of bit sequences, for each signal point in the constellation, a set comprising the determined number of bit sequences that minimize the maximal Hamming distance among the selected sets.

Such a device in a telecommunication network may be, for example, a Base Station, a terminal, a server etc.

In an embodiment according to the invention, the selection unit is further configured for selecting a first set of bit sequences for a first signal point, the Hamming distance of which being smaller or equals to two.

The selection unit may be further configured for selecting a first bit sequence then selecting as many bit sequences as needed to reach the determined number of bit sequences in the first set, each further selected bit sequence being different from the first bit sequence by only one bit.

In an embodiment according to the invention, the selection unit is further configured, for a second signal point being a neighboring signal point of the first signal point in the constellation, for selecting a second bit sequence in a second set, which minimize the average Hamming distance between said second bit sequence and the first set selected for the first signal point, then selecting as many bit sequences as needed to reach the determined number of bit sequences in the second set.

In an embodiment according to the invention, the selection unit is further configured, for a third signal point being a neighboring signal point of the first signal point or of the second signal point in the constellation, for selecting a third bit sequence in a third set, which minimize the average Hamming distance with the first set selected for the first signal point, or, respectively, with the second set selected for the second signal point, then selecting as many bit sequences as needed to reach the determined number of bit sequences in the third set.

In an embodiment according to the invention, the selection unit is further configured for selecting a selection with the minimum maximal Hamming distance in each selected sets.

In an embodiment according to the invention, the selection unit is further configured for selecting a selection with the minimum average of the average Hamming distances among the selected sets.

In an embodiment according to the invention, the selection unit is further configured for selecting the bit sequences that minimize the average Hamming distance of each set.

In an embodiment according to the invention, the determination unit is configured for associating signal points closest from the center of the constellation with the greatest numbers of bit sequences to be mapped to said signals points and associating signal points furthest from the center of the constellation with the smallest numbers of bit sequences to be mapped to said signals points.

In an embodiment according to the invention, the determination unit is further configured for selecting a distribution of numbers of bit sequences which approach the most near a Gaussian distribution of discrete values for the same constellation.

In an embodiment according to the invention, the determination unit is further configured for performing the determination of all the possible discrete Gaussian distributions of numbers of bit sequence, for calculating, for each determined distribution, a mutual information between an input signal and a output signal over an Additive White Gaussian Noise channel and for selecting, among the determined distributions, the distribution with the maximum calculated mutual information.

The invention also concerns a computer-readable medium having computer-executable instructions to enable a computer system to perform the method according to the invention as described here above.

BRIEF DESCRIPTION OF THE DRAWINGS

Embodiments of the present invention will now be described solely by way of example and only with reference to the accompanying drawings, where like parts are provided with corresponding reference numerals, and in which.

DESCRIPTION OF PREFERRED EMBODIMENTS

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, devices etc. . . . , for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, gateways or other entities in a telecommunication network are not detailed as their implementation is beyond the scope of the present system and method.

Unless specified otherwise, the exemplary embodiment will be described hereafter in its application to a modulation system of a telecommunication device.

In addition, it should be expressly understood that the drawings are included for illustrative purposes and do not represent the scope of the present system.

Figure 2:
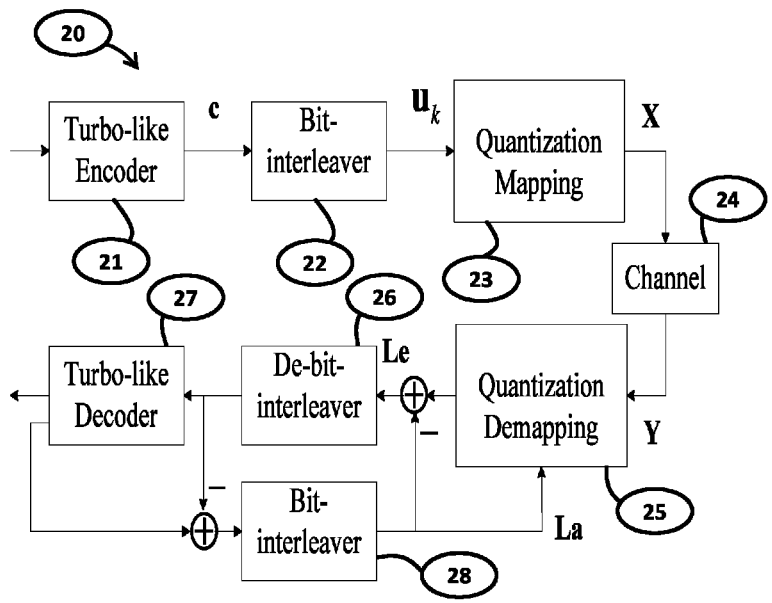

FIG. 2 schematically illustrates a modulation system 20 therein configured for operating a Bit-Interleaved Coded Modulation-Iterative Decoding (BICM-ID) scheme using quantization mapping.

A digital bit stream of data is encoded using a turbo-like encoder 21. The encoded data c are bit-interleaved by a bit-interleaver 22, i.e. arranged in a non-contiguous way to increase performance on the communication channel, then the corresponding $u_k$ bit sequences are sent to a quantization mapping unit 23.

The quantization unit 23 allows mapping bit sequences to signal points. The signal X comprising the symbols corresponding to the signal points are then sent over a communication channel 24.

The device that performs coding, bit-interleaving, mapping on a digital bit stream and then sends the corresponding symbols on a communication channel is an emitter whereas a device that receives symbols from a communication channel and then performs decoding, de-interleaving and demapping is a receiver. A unique device may be both an emitter and a receiver.

At the receiver, demapping is first performed, by the quantization demapping unit 25 on the signal Y received from channel 24 and on interleaved extrinsic information La outputted by a turbo-like decoder 27. The information outputted by the quantization demapping unit 25, called extrinsic Log Likelihood Ratio (LLR) information, is de-interleaved by a de-bit-interleaver 26 and sent to the turbo-like decoder 27 as an input information. After decoding by the turbo-like decoder 27, the output extrinsic LLR information is bit-interleaved and sent to the quantization demapping unit 25. This iteration operation continues until a predetermined iteration number has been reached.

In the following description:

$u_k=(u_k(1), u_k(2) \ldots u_k(T))$ represents an interleaved bit sequence after encoding, x represents a symbol sequence after quantization mapping, which will be sent over the channel 24, which may be for example a discrete-time memoryless Additive White Gaussian Noise (AWGN) channel.

The symbol sequence y=(y$_1$, y$_2$, ..., y$_k$, ...) received by the quantization demapping unit 25 may be described by:

$$y = x + n,$$

where n is the here the known additive Gaussian noise vector with each element independently and identically subject to CN (0, N$_0$).

The quantization demapping unit 25 processes the received symbols y$_k$ and the corresponding a priori LLR from decoder $$L_a(u_k(i)) = \log\left(\frac{P(u_k(i) = 0)}{P(u_k(i) = 1)}\right),$$

and generates the output LLR:

$$L_e(u_k(i)) = \log\frac{P(u_k(i) = 0 \mid y_k, L_a(u_k))}{P(u_k(i) = 1 \mid y_k, L_a(u_k))} - L_a(u_k(i)).$$

which is taken as extrinsic information by the turbo-like decoder 27.

Figure 3:
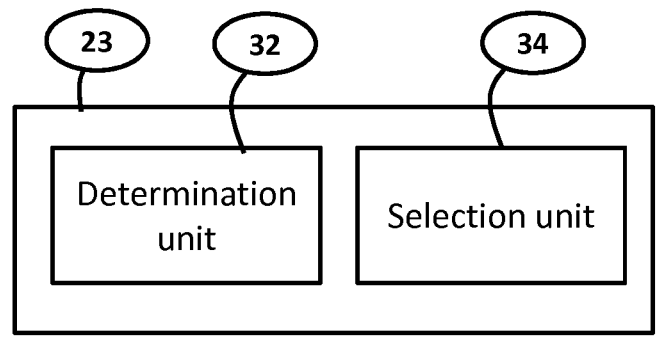
Figure 4:
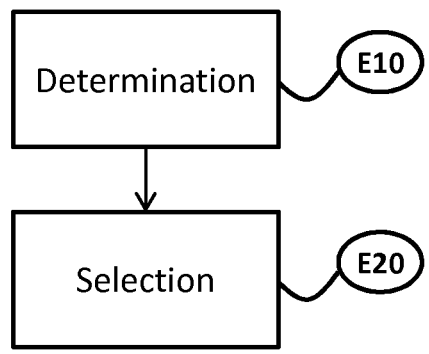
FIG. 4 illustrates the method according to the invention.

The device according to the invention comprises a quantization mapping unit 23, illustrated by FIG. 3, which is configured for mapping a plurality of different bit sequences to a plurality of different signal points in a constellation, the number of bit sequences being greater than the number of signal points.

A constellation of signal points may be a one-dimensional set of signal points, e.g. a series of values like x={−9, −7, −5, −3, −1, 1, 3, 5, 7, 9} in a 10-PAM modulation scheme or a two-dimensional set of signal points wherein each signal point is represented by a couple of values like e.g. x={(3,3), (1,3)(−1,3)(−3,3)(3,1)(1,1)(−1,1)(−3,1)(3,−1)(1,−1)(−1,−1) (−3,−1)(3,−3)(1,−3)(−1,−3)(−3,−3)} in a 16-QAM modulation scheme.

The quantization mapping unit 23 comprises:
a determination unit 32 configured for determining, for each signal point in the constellation, a number of bit sequences to be mapped to said each signal point, the numbers of bit sequences being distributed according to a discrete Gaussian distribution among the constellation,
a selection unit 34 configured for selecting in the plurality of bit sequences, for each signal point in the constellation, a set comprising the determined number of bit sequences that minimize the maximal Hamming distance among the selected sets.

Quantization mapping will know be described, wherein A$_x$={a$_0$, a$_1$, ..., a$_{M-1}$} denotes a signal constellation of size M.

P(x), x∈A$_x$ is a probability mass function associated with a mapping.

In a uniform mapping, bit sequences are mapped equally likely to the signal points, and the corresponding mapping distribution may be expressed as P(x)=1/M.

A quantization mapping $Q_{P(x)}(u): \{0,1\}^T \rightarrow A_x$ is a mapping from binary vectors u=(u$_1$, u$_2$, ..., u$_T$) of length T to A$_x$ such that the number of vectors mapped to x is $2^T P(x)$. For brevity, Q(u) is used hereunder for $Q_{P(x)}(u)$.

The quantization mapping distribution to a vector u with length of N may be described as:

$$Q(u) = \{Q(u_1, u_2 \ldots u_T), Q(u_{T+1}, u_{T+2} \ldots u_{2T}) \ldots, Q(u_{N-T+1}, u_{N-T+2} \ldots u_N)\}$$

Consequently, when p(x) follows a non-uniform distribution, then $Q(u_i, u_{i+1} \ldots) \ldots Q(u_{N-T+1}, u_{N-T+2} \ldots u_N)$ also follows a non-uniform distribution.

Figure 1:
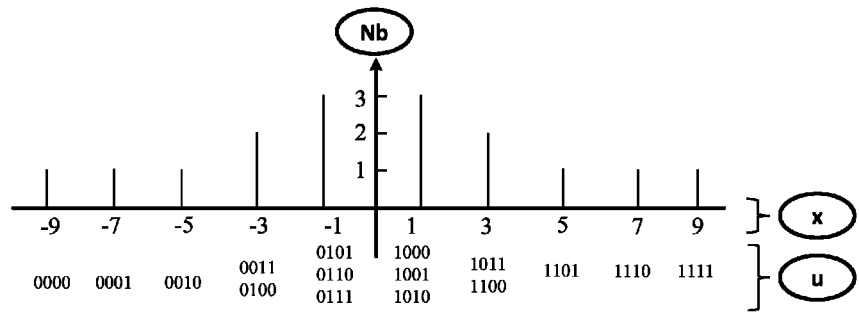
FIG. 1 schematically illustrates a quantization mapping between 16 bit sequences and 10 signal points according to the prior art, FIG. 2 schematically illustrates a modulation system, FIG. 3 schematically illustrates a device according to the invention.

The quantization mapping is illustrated by FIG. 1 for a 10-PAM modulation and T=4, Q={−9, −7, −5, −3, −3, −1, −1, −1, 1, 1, 1, 3, 3, 5, 7, 9} and the mapping pattern shows the natural ascending order used in the prior art {Q(0000), Q(0001), ..., Q(1110), Q(1111)}, In this example, the quantization mapping distribution function is:

$$P(x) = \begin{cases} 1/16, & x = -9 \\ 1/16, & x = -7 \\ 1/16, & x = -5 \\ 2/16, & x = -3 \\ M \\ 1/16, & x = 9 \end{cases}$$

In this example, the number of vectors, i.e. bit sequences, mapped to signal point −3 is $2^4$ P(−3)=2, the number of bit sequences mapped to signal point 1 is $2^4$ P(1)=3.

The method according to the invention allows mapping a plurality of different bit sequences to a plurality of different signal points in a constellation, the number of bit sequences being greater than the number of signal points.

A number, of bit sequences to be mapped to each signal point in, is first determined, for each signal point the constellation, in act E10. The numbers of bit sequences are distributed according to a discrete Gaussian distribution among the constellation.

A set of bit sequences is selected among the plurality of bit sequences, in act E20, for each signal point in the constellation, said set comprising the determined number of bit sequences that minimize the maximal Hamming distance among all the selected sets mapped to each signal point in the constellation.

Consequently, the method according to the invention allows mapping all the bit sequences to each signal point. In the mapping according to the invention, a bit sequence in a set is different from any other bit sequence in the set and also different from any other bit sequence in any other set of bit sequences. Once mapped, several bit sequences may be associated to one signal point, but each bit sequence of the plurality of bit sequences is mapped with one and only one signal point in the constellation.

Act E10 allows therefore the probability mass function of the signal points in the employed constellation to approach the discrete Gaussian distribution and act E20 allows minimizing the maximal Hamming distance in each set associated with a signal point.

Figure 5:
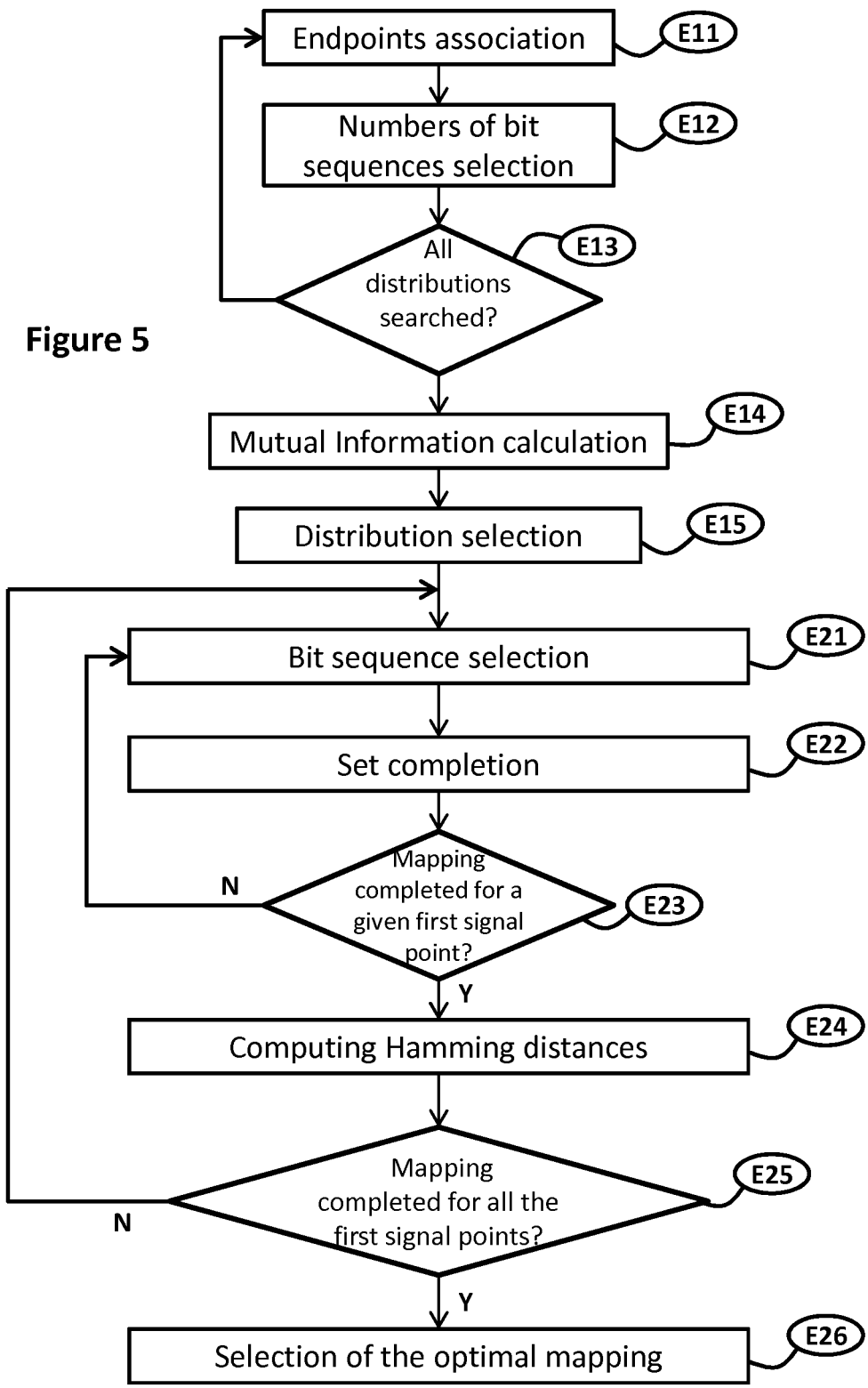
FIG. 5 illustrates the method according to an embodiment the invention.

FIG. 5 illustrates the method according to an embodiment of the present invention. In this exemplary embodiment, a one-dimensional constellation set with 2b signal points is used. An example of a constellation 61 with b=2, i.e. four signal points A, B, C, D, for 8 bit sequences is illustrated on FIG. 6.

Figure 6:
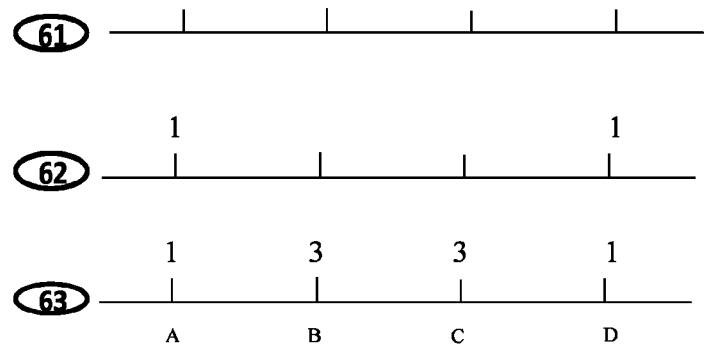
FIG. 6 illustrates an example of near Gaussian discrete determination.

At first, one bit sequence is associated, in act E11, to the marginal signal points, i.e. the two ends of the constellation 62 as illustrated by FIG. 6, in order to make sure the probability mass is little for these points.

Then, in act E12, more numbers of bit sequences are associated to the signal points which are approaching the center of the constellation in order to increase the probability mass for these central points, until the total number of associated bit sequences has been reached, i.e. until 8 in the example illustrated by FIG. 6.

In act E13, all discrete probability distributions which satisfy the condition of acts E11 and E12 may be searched.

In act E14, according to all possible probability distributions searched, the mutual information I(X; Y) between the input signal X and the output signal Y over an Additive White Gaussian Noise (AWGN) channel may be calculated. Mutual information of two random variables is a quantity that measures the mutual dependence of the two random variables.

The distribution, which has the maximal mutual information, is then selected in act E15. This distribution is the nearest discrete Gaussian distribution.

For example, as described by FIG. 6, the distribution 63 implies that points A and D may further be mapped to Nb=1 bit sequence and points B and C may further be mapped to Nb=3 bit sequences.

Once the optimal distribution has been selected, bit sequences may be selected to further be mapped to signal points according to the numbers Nb of bit sequences u that have been determined, for each signal point x in the constellation, in the optimal distribution.

A set of bit sequence(s) is selected for a first signal point. At first, a first bit sequence is selected, in act E21, for any one signal point, for example point B, in reference to FIG. 6. More bit sequences are then selected if needed, in act E22, until the determined number of bit sequences for the set associated with the corresponding first signal point, according to the distribution selected in act E15, has been reached, each one of the other selected bit sequences in the set having only one different bit from the first bit sequence selected in act E21. For example, in the example illustrated by FIG. 6, two more bit sequences are then selected for the set of bit sequences associated with point B, each of which having only one different bit from the first bit sequence selected in act E21. Act E22 allows minimizing the maximal Hamming distance within the set.

Once the set of bit sequences has been selected for the first signal point, in this example point B in reference to FIG. 6, it is checked, in act E23, if any signal point has not been mapped yet to a set of bit sequences. If so, a new set of bit sequences will be selected for a second signal point, neighboring the first signal point, for example point C in reference to FIG. 6.

To that end, a bit sequence, which has not been yet selected in a set associated with a mapped signal point, is selected, in act E21, for the second signal point (e.g. point C, in reference to FIG. 6). As a set has previously been selected for a neighboring signal point, namely the first signal point, act E22 further comprises here selecting, for the second signal point, a bit sequence that minimizes the number of different bits, i.e. the Hamming distance, between said new bit sequence selected and every bit sequence within the set selected for the first signal point (B, in reference to FIG. 6), i.e. the first set. In other words, act E22 further comprises here selecting, for the second signal point, a bit sequence that minimizes the Hamming distance between said bit sequence and the first set. The Hamming distance between a bit sequence and a set corresponds to the average Hamming distance between the bit sequence and each bit sequence in the first set.

The acts E21 and E22 are performed for a third signal point and then the remaining signal points in the constellation, if any, until all the sets of bit sequences have been selected for all the signal points of the constellation (act E23), e.g. until the four sets (i.e. the 8 bit sequences) have been selected for the four signal points A, B, C, D in the example illustrated by FIG. 6. This allows generating a selection comprising all the different bit sequences, i.e. generating a mapping of all the bit sequences to all the signal points. The Hamming distance within each set and between sets of the fixed constellation may then be computed in act E24.

The acts E21 to E24 may be repeated, using a different first signal point, for example starting from point A rather than point B in the example illustrated by FIG. 6, until every signal point in the constellation has been used as a first signal point (act E25) in order to obtain a plurality of generated set selections.

Among the generated selections, the generated selection one, or one of the generated selections, with the smallest maximal Hamming distance among sets, i.e. in each set, or with the smallest average of the Hamming distance averages of each set, may be selected, in act E26, as the optimal selection, so that the optimized selection is mapped to the corresponding signal points.

Figure 7:
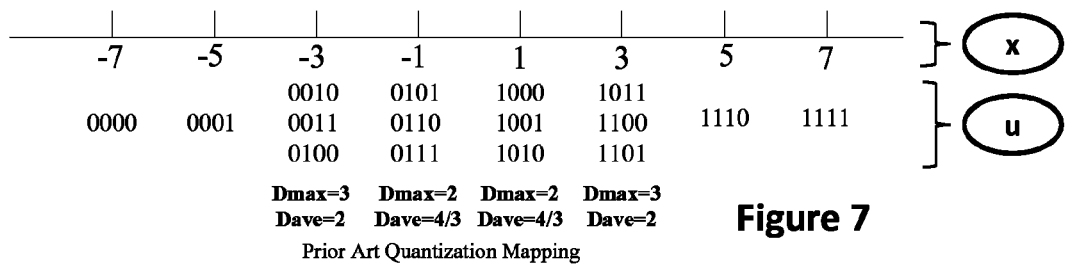
FIG. 7 illustrates a prior art quantization mapping using 8-PAM modulation.
Figure 8:
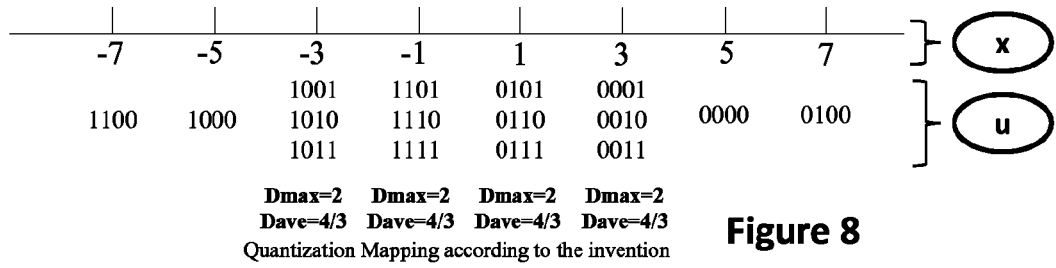
FIG. 8 illustrates a quantization mapping using 8-PAM modulation according to the invention.

FIG. 7 illustrates a mapping according to the prior art and FIG. 8 illustrates a mapping using the method according to the invention. In both examples, 8-PAM quantization mapping is used with signal points x={-7, -5, -3, -1, 1, 3, 5, 7} wherein signal points x=-7, -5, -5 and 7 are mapped with one bit sequence u and signal points x=-3, -1, 1 and 3 are mapped with three bit sequences u.

For example, as illustrated by FIG. 8, with the method according to the invention, the first bit sequence 1011 in the set associated to signal point x=-3 has only one bit difference from the two other bit sequences in the set 1010 and 1001.

The first (and only) bit sequence 1000 in the set associated to neighboring signal point x=-5 has a Hamming distance with the selected set (1011, 1010, 1001) equals to 2 and a Hamming distance with bit sequence 1100 in the set associated to signal point x=-7, equals to 1.

The first bit sequence 1111 in the set associated to signal point x=-1 has only one bit difference with 1110 and 1101 which are in the same selected set for which the maximal Hamming distance is Dmax=2 (Hamming distance between 1101 and 1110). The first bit sequence 1111 in the set associated to signal point x=-1 (neighbor of signal point x=-3) has only one bit difference with 1011, two bits difference with 1010 and two bits difference with 1001, i.e. a Hamming distance with the selected set (1011, 1010, 1001) equals to (1+2+2)/3=5/3.

The first bit sequence 0111 in the set associated to neighboring signal point x=1 has only one bit difference with 0110 and 0101 which are in the same selected set for which the maximal Hamming distance is Dmax=2 (Hamming distance between 0101 and 0110).

The first bit sequence 0111 in the set associated to signal point x=1 has only one bit difference with 1111, two bits difference with 1110 and two bits difference with 1101, i.e. a Hamming distance with the selected set (1111, 1110, 1101) equals to (1+2+2)/3=5/3.

The first bit sequence 0011 in the set associated to neighboring signal point x=3 has only one bit difference with 0010 and 0001 which are in the same selected set for which the maximal Hamming distance is Dmax=2 (Hamming distance between 0010 and 0001).

The first bit sequence 0011 in the set associated to signal point x=1 has only one bit difference with 0111, two bits difference with 0110 and two bits difference with 0101, i.e. a Hamming distance with the selected set (0111, 0110, 0101) equals to (1+2+2)/3=5/3.

The first (and only) bit sequence 0000 in the set associated to neighboring signal point x=5 has a Hamming distance with the selected set (0011, 0010, 0001) equals to 2 and a Hamming distance with bit sequence 0100 in the set associated to signal point x=7, equals to 1.

Such a sets selection is the selection, among the combinations of selections derived using the method according to the invention, which minimizes the maximal Hamming distance within each set of the plurality of sets, each set being associated or mapped to one signal point in the constellation.

With the prior art quantization mapping illustrated by FIG. 7, the maximal Hamming distance (Dmax) is 3 among the sets of bit sequences u, while with the quantization mapping according to the invention, illustrated by FIG. 8, the maximal Hamming distance (Dmax) is 2 among the sets of bit sequences u.

Moreover, with the prior art quantization mapping illustrated by FIG. 7, the average Hamming distance (Dave) is equal to 2 for two sets and to 4/3 for two other sets, while with the quantization mapping according to the invention, illustrated by FIG. 8, the average Hamming distance (Dave) is equal to 4/3 for each set.

Figure 9:
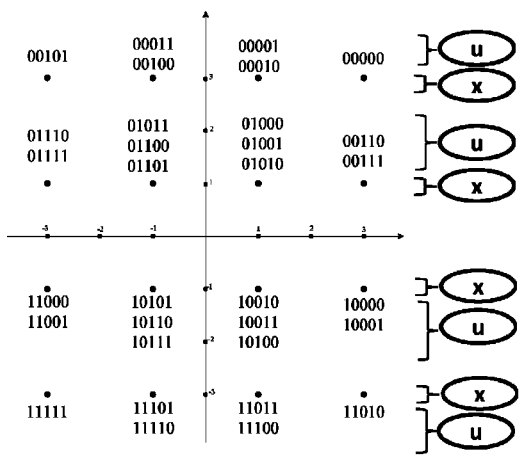
FIG. 9 illustrates a prior art quantization mapping using 16-QAM modulation.
Figure 10:
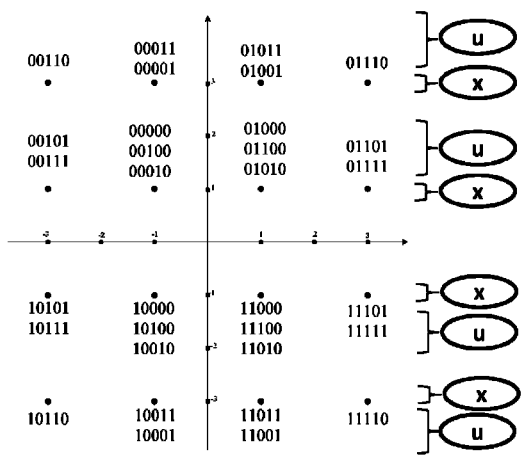
FIG. 10 illustrates a prior art quantization mapping using 16-QAM modulation according to the invention, FIG. 11 a simulation result according to the invention using 8-PAM modulation.

FIG. 9 illustrates a mapping according to the prior art and FIG. 10 illustrates a mapping using the method according to the invention. In both examples, 16-QAM quantization mapping is used. With the prior art quantization mapping illustrated by FIG. 9, the maximal Hamming distance (Dmax) is 3 among the sets of bit sequences u, while with the quantization mapping according to the invention, illustrated by FIG. 8, the maximal Hamming distance (Dmax) is 2 among the sets of bit sequences u.

Figure 11:
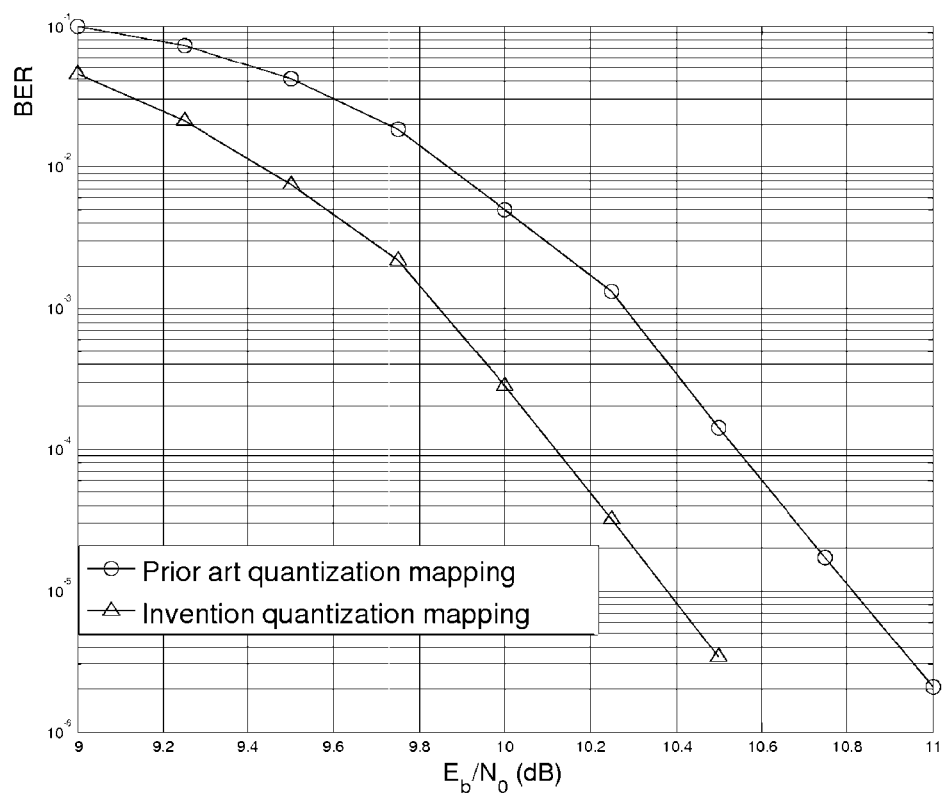

FIG. 11 illustrates a performance simulation of the Bit Error Rate (BER) function of the Eb/No (energy to noise ratio). In the simulation, a Binary LDPC rate-½, [9216, 4608] channel code is used, with an 8-PAM modulation scheme, on an AWGN channel. The simulation demonstrates a gain of about 0.5 dB to be made over prior art quantization mapping by using 8-PAM signaling. Eventually, BER performance is improved with the same transmission power and higher spectral efficiency may be achieved based on the same or lower-order modulation.

The invention claimed is:

1. A method of mapping a plurality of different bit sequences to a plurality of different signal points in a constellation, the number of bit sequences being greater than the number of signal points, said method comprising, for a device in a telecommunication network, the acts of:
   determining by a determining unit of the device, for each signal point in the constellation, a number of bit sequences to be mapped to said each signal point, the numbers of bit sequences being distributed according to a discrete Gaussian distribution among the constellation, and
   selecting by a selecting unit of the device in the plurality of bit sequences, for each signal point in the constellation, a set comprising the determined number of bit sequences that minimize the maximal Hamming distance among the selected sets.

2. The method according to claim 1, said method further comprising a preliminary act, subsequently to the act of determining, of the selecting unit selecting a first set of bit sequences for a first signal point, the Hamming distance of which being smaller or equals to two.

3. The method according to claim 2, wherein the act of selecting a set further comprises the selecting unit selecting a first bit sequence then selecting as many bit sequences as needed to reach the determined number of bit sequences in the first set, each further selected bit sequence being different from the first bit sequence by only one bit.

4. The method according to claim 3, wherein the act of selecting a set further comprises the act of selecting a set further comprises, for a second signal point being a neighboring signal point of the first signal point in the constellation, the selecting unit selecting a second bit sequence in a second set, which minimize the average Hamming distance between said second bit sequence and the first set selected for the first signal point, then selecting as many bit sequences as needed to reach the determined number of bit sequences in the second set.

5. The method according to claim 4, wherein the act of selecting a set further comprises, for a third signal point being a neighboring signal point of the first signal point or of the second signal point in the constellation, the selecting unit selecting a third bit sequence in a third set, which minimize the average Hamming distance with the first set selected for the first signal point, or, respectively, with the second set selected for the second signal point, then selecting as many bit sequences as needed to reach the determined number of bit sequences in the third set.

6. The method according to claim 5, wherein the act of selecting set is performed for all the signal points in the constellation until all the bit sequences have been selected.

7. The method according to claim 6, wherein the act of selecting is performed starting from each one of the signal points in the constellation as being a first signal point to derive a plurality of selections of selected sets.

8. The method according to claim 7, wherein the act of selecting further comprises the selecting unit selecting a selection with the minimum maximal Hamming distance in each selected sets.

9. A device in a telecommunication network for mapping a plurality of different bit sequences to a plurality of different signal points in a constellation, the number of bit sequences being greater than the number of signal points, said device comprising:
   a determination unit configured for determining, for each signal point in the constellation, a number of bit sequences to be mapped to said each signal point, the numbers of bit sequences being distributed according to a discrete Gaussian distribution among the constellation, and
   a selection unit configured for selecting in the plurality of bit sequences, for each signal point in the constellation, a set comprising the determined number of bit sequences that minimize the maximal Hamming distance among the selected sets.

10. The device according to claim 9, wherein the selection unit is further configured for selecting a first set of bit sequences for a first signal point, the Hamming distance of which being smaller or equals to two.

11. Previously Presented) The device according to claim 9, wherein the selection unit is further configured for selecting a first bit sequence then selecting as many bit sequences as needed to reach the determined number of bit sequences in the first set, each further selected bit sequence being different from the first bit sequence by only one bit.

12. A device according to claim 11, wherein the selection unit is further configured, for a second signal point being a neighboring signal point of the first signal point in the constellation, for selecting a second bit sequence in a second set, which minimize the average Hamming distance between said second bit sequence and the first set selected for the first signal point, then selecting as many bit sequences as needed to reach the determined number of bit sequences in the second set.

13. The device according to claim 12, wherein the selection unit is further configured, for a third signal point being a neighboring signal point of the first signal point or of the second signal point in the constellation, for selecting a third bit sequence in a third set, which minimize the average Hamming distance with the first set selected for the first signal point, or, respectively, with the second set selected for the second signal point, then selecting as many bit sequences as needed to reach the determined number of bit sequences in the third set.

14. The device according to claim 13, wherein the selection unit is further configured for selecting a selection with the minimum maximal Hamming distance in each selected sets.

15. A non-transitory computer-readable medium having computer-executable instructions to enable a computer system to perform a method of mapping a plurality of different bit sequences to a plurality of different signal points in a constellation, the number of bit sequences being greater than the number of signal points, said method comprising, for a device in a telecommunication network, the acts of:

determining, for each signal point in the constellation, a number of bit sequences to be mapped to said each signal point, the numbers of bit sequences being distributed according to a discrete Gaussian distribution among the constellation, and selecting in the plurality of bit sequences, for each signal point in the constellation, a set comprising the determined number of bit sequences that minimize the maximal Hamming distance among the selected sets.

* * * * *